(12) United States Patent
Morales et al.

(10) Patent No.: US 11,405,435 B1
(45) Date of Patent: Aug. 2, 2022

(54) SYSTEMS AND METHODS TO PRESENT VIEWS OF RECORDS IN CHAT SESSIONS BETWEEN USERS OF A COLLABORATION ENVIRONMENT

(71) Applicant: Asana, Inc., San Francisco, CA (US)

(72) Inventors: Alvaro Morales, San Francisco, CA (US); Eric Lee Campbell, Oakland, CA (US); Manya Sofia Spieczny Scheps, Berkeley, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

(21) Appl. No.: 17/109,947

(22) Filed: Dec. 2, 2020

(51) Int. Cl.
*G06F 3/0481* (2022.01)
*G06F 16/9536* (2019.01)
*H04L 65/403* (2022.01)

(52) U.S. Cl.
CPC .......... *H04L 65/403* (2013.01); *G06F 3/0481* (2013.01); *G06F 16/9536* (2019.01)

(58) Field of Classification Search
CPC .... G06F 19/9536; G06F 3/0481; G06F 3/048; G06F 16/09; H04L 65/402; H04L 51/046
See application file for complete search history.

(56) References Cited

U.S. PATENT DOCUMENTS

| | | | |
|---|---|---|---|
| 5,233,687 A | 8/1993 | Henderson, Jr. | |
| 5,524,077 A | 6/1996 | Faaland | |
| 5,530,861 A | 6/1996 | Diamant | |
| 5,608,898 A | 3/1997 | Turpin | |
| 5,611,076 A | 3/1997 | Durflinger | |
| 5,623,404 A | 4/1997 | Collins | |
| 5,721,770 A | 2/1998 | Kohler | |
| 5,983,277 A | 11/1999 | Heile | |
| 6,024,093 A | 2/2000 | Cron | |
| 6,256,651 B1 | 7/2001 | Tuli | |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

Hartmann, "TimeProjectscheduling with resource capacities and reguests varying with time: a case study," 2013, Flexible services and manufacturing journal, vol. 25, No. 1, pp. 74-93 (Year: 2013).

(Continued)

*Primary Examiner* — Jennifer N Welch
*Assistant Examiner* — Qi Wan
(74) *Attorney, Agent, or Firm* — Esplin & Associates, PC

(57) ABSTRACT

Systems and methods for presenting views of work unit records in chat sessions between users of a collaboration environment are disclosed. Exemplary implementations may: obtain content information characterizing content of the chat sessions between the users of the collaboration environment; identify work unit records based on the content from the chat sessions; generate view of work unit pages in the chat sessions that correspond to the work unit records identified based on the content from the chat sessions so that the view of the work unit pages are made accessible to the users during synchronous communication facilitated by the chat sessions; and/or other perform other operations.

16 Claims, 3 Drawing Sheets

(56) References Cited

U.S. PATENT DOCUMENTS

| | | |
|---|---|---|
| 6,292,830 B1 | 9/2001 | Taylor |
| 6,332,147 B1 | 12/2001 | Moran |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 * | 4/2020 | Cameron ............... H04L 51/04 |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |

(56) References Cited

U.S. PATENT DOCUMENTS

| | | |
|---|---|---|
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1* | 12/2009 | Lee ................. G10L 15/26 379/202.01 |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | DeHaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1* | 12/2012 | Okazaki ............. G06F 3/04815 707/732 |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Boni |
| 2014/0040780 A1 | 2/2014 | Artzt |
| 2014/0040905 A1 | 2/2014 | Tsunoda |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |

(56) References Cited

U.S. PATENT DOCUMENTS

| | | |
|---|---|---|
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1* | 6/2018 | Adika .................. G06F 16/957 |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1* | 11/2018 | Faulkner .................. H04N 7/15 |
| 2018/0357049 A1 | 12/2018 | Epstein |
| 2018/0367477 A1 | 12/2018 | Hariram |
| 2018/0367483 A1* | 12/2018 | Rodriguez .............. H04L 65/60 |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani et al. |
| 2020/0059539 A1* | 2/2020 | Wang ...................... H04L 67/38 |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |

FOREIGN PATENT DOCUMENTS

| | | |
|---|---|---|
| CN | 102378975 B | 5/2015 |
| WO | 2015036817 A1 | 3/2015 |

(56) References Cited

FOREIGN PATENT DOCUMENTS

| | | |
|---|---|---|
| WO | 2015123751 A1 | 8/2015 |
| WO | 2020006634 A1 | 1/2020 |

OTHER PUBLICATIONS

Paul Minors, How to automate your tasks, youtube excerpts, Oct. 18, 2019 https://www.youtube.com/watch?v=IwF9XyUQrzw (Year: 2019).
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).
"U.S. Appl. No. 14/584,750, Examiner Interview Summary dated Feb. 25, 2016", 3 pgs.
"U.S. Appl. No. 14/584,750, Non Final Office Action dated Aug. 28, 2015", 21 pgs.
"U.S. Appl. No. 14/584,750, Notice of Allowance dated Mar. 28, 2016", 8 pgs.
"U.S. Appl. No. 14/584,750, Response filed Feb. 29, 2015 to Non Final Office Action dated Aug. 28, 2015", 16 pgs.
"U.S. Appl. No. 14/584,850, Final Office Action dated Sep. 1, 2017", 31 pgs.
"U.S. Appl. No. 14/584,850, Non Final Office Action dated Jan. 10, 2017", 9 pgs.
"U.S. Appl. No. 14/584,850, Response filed Apr. 10, 2017 to Non Final Office Action dated Jan. 10, 2017", 13 pgs.
Creating Tables with Fields from 2 Different Tables, published: 2009, publisher: StackOverflow, pp. 1-2. (Year: 2009).
"How to Asana: Inviting teammates to Asana." YouTube, Asana, Mar. 21, 2017, https://www.youtube.com/watch?v=TLOruY1KyxU (Year: 2017), 13 pages.
"Rules of Data Conversion from Document to Relational Databases", published: 2014, publisher: Future-processing, pp. 1-8 (Year: 2014).
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios,youtube,excerpt, Aug. 1, 2019 https://www.youtube.com/watch?v=7XkNcfFDG6M (Year: 2019) (20 pages).
Asana YouTube channel, list of all product videos, Nov. 19, 2014- Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana,Manage your team capacity with Workload, youtube, excerpt, Aug. 1, 2019 https://www.youtube.com/watch?v=2ufXyZDzZnA&list=PLJFG93oi0wJAi UwyOhlGWHdtJzJrzylBv (Year: 2019) (1 page).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, Wikipedia, archives org, Mar. 16, 2018 https://web.archive.org/web/20180316193655/https://en.wikipedia.org/wiki/Command_and_control (Year: 2018), 6 pages.
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
Www.cogmotive.com/blog/author/alan Alan Byrne: "Creating a company Shared Calendar in Office 365"; pp. 1-17; Sep. 10, 2013.
Macro, computer science, Wikipedia, archives org Feb. 11, 2020 http://web.archive.org/web/20200211082902/https://en.wikipedia.org/wiki/Macro_(computer_science) (Year: 2020).
(Tiburca, Andrew) Best Team Calendar Applications for 2018- Toggl https://toggl.com/blog/best-team-calendar-applications-for-2018 (Year: 2017).
Assef, F., Cassius, T. S., & Maria, T. S. (2018). Confrontation between techniques of time measurement. Journal of Manufacturing Technology Management, 29(5), 789-810. (Year: 2018).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

(56) References Cited

OTHER PUBLICATIONS

Dawei Li, "Deepcham: Collaborative Edge-Mediated Adaptive Deep Learning for Mobile Object Recognition", 2016, IEEE/ACM, pp. 64-76. (Year: 2016).

\* cited by examiner

SYSTEMS AND METHODS TO PRESENT VIEWS OF RECORDS IN CHAT SESSIONS BETWEEN USERS OF A COLLABORATION ENVIRONMENT

FIELD OF THE DISCLOSURE

The present disclosure relates to systems and methods for presenting views of records in chat sessions between users of a collaboration environment.

BACKGROUND

Some work management platforms providing a collaboration environment typically require users to manually navigate to units of work to view its content. Without such manual input, computers generally cannot identify and present units of work for users automatically. This may create more work for users and reduce user efficiency. As such, users and companies waste valuable resources and may be unlikely to use a work management platform long term.

SUMMARY

One aspect of the present disclosure relates to a system configured for presenting views of work unit records and/or other records in chat sessions between users of a collaboration environment. The records may be identified dynamically for users participating in a chat session through the graphical chat interface and/or based on content from the chat session through the graphical chat interface. Upon identifying the records, a view of the records may be presented to one or more users during the chat session. Thus, the one or more users are alleviated from manually searching for the records they are discussing in a chat session, therefore increasing work and communication efficiency.

One aspect of the present disclosure relates to a system for presenting views of work unit records based on chat sessions between users of a collaboration environment. The system may include one or more of server(s), chat server(s), client computing platform(s), and/or other components. The one or more servers may be configured to communicate with one or more client computing platforms according to a client/server architecture and/or other architecture. The one or more servers, chat servers, and/or client computing platforms may include one or more physical processors configured to execute one or more computer program components. The computer program components may include one or more of an environment state component, a chat application component, a collaboration environment component, content component, view page component, and/or other components.

The environment state component may be configured to manage environment state information maintaining the collaboration environment. The collaboration environment may be configured to facilitate interaction by users with the collaboration environment. In some implementations, the environment state information may include work unit records describing units of work assigned to, created by, and/or managed by individual users within the collaboration environment, and/or other records. It is noted that while one or more implementations described herein may be directed to identifying work unit records, this is for illustrative purposes only. Instead, it is to be understood that the features and/or functions described herein may be extended to other records and/or other content, which may be referred to herein collectively as "records" and/or "content records" whether or not a specific "record" for the content has been specifically described herein. In some implementations, environment state component may be configured to effectuate transmission of the environment state information to client computing platform(s), and/or vice versa. In some implementations, the environment state component may be configured to receive information over a network from the client computing platforms(s).

The content component may be configured to obtain content information characterizing content of the chat sessions between the users of the collaboration environment. The chat sessions may facilitate communication between the users. The communication may be synchronous, asynchronous, and/or semi-synchronous. The chat sessions may include a first chat session between a first user and a second user and/or other chat sessions between other users. By way of non-limiting illustration, first content information may characterize content of the first chat session.

The content component may be configured to identify one or more of the work unit records and/or other information. The one or more work unit records may be identified based on the content from the chat sessions and/or other information. By way of non-limiting illustration, a first work unit record may be identified based on the first content information for the first chat session.

The view page component may be configured to generate views of work unit pages in the chat sessions that correspond to the work unit records identified based on the content from the chat sessions. By way of non-limiting illustration, a view of a first work unit page for the first work unit record may be generated in the first chat session. Thus, the view of the first work unit page may be made accessible to the first user and the second user during the communication facilitated by the first chat session.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Generating views of record pages in chat sessions between users of a collaboration environment may be enabled in communications between multiple users. The records may be identified dynamically for one or more users participating in a chat session through the graphical chat interface and/or based on content from the chat session through the graphical chat interface. Pages for viewing the records may be automatically presented to the sender of a communication, one or more recipients of the communication, and/or other users based on the content of the one or more chat sessions. Pages may be presented in real-time within a given chat session, near-real time within the given chat session, at the end of the given chat session, and/or at any other time during the given chat session.

Figure 1:
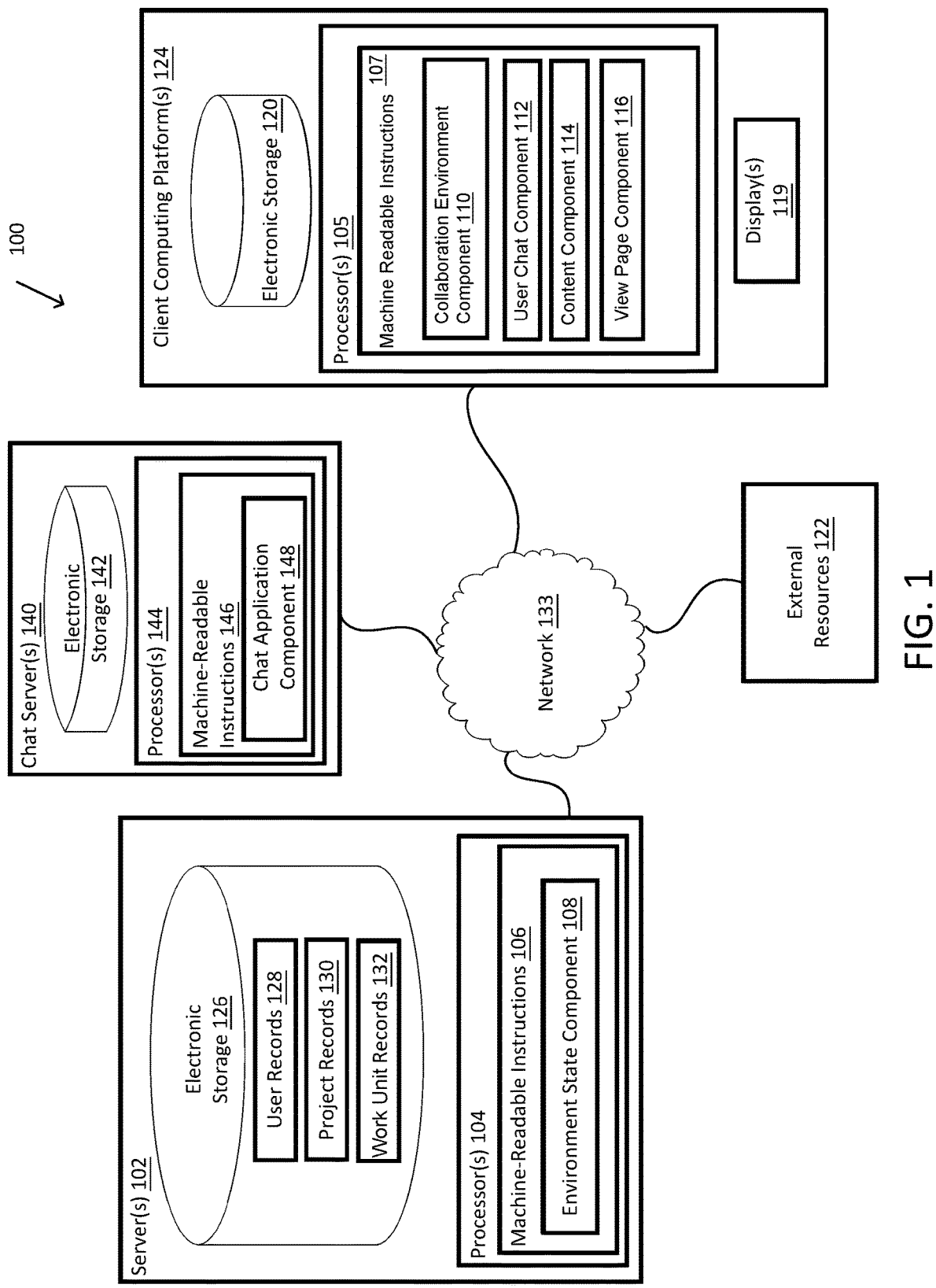
FIG. 1 illustrates a system configured for presenting views of records in chat sessions between users of a collaboration environment, in accordance with one or more implementations.

As is illustrated in FIG. 1, system 100 may include one or more of: one or more servers 102, one or more chat servers 140, one or more client computing platforms 124, external resource(s) 122, and/or other components. Users may interact with system 100 via one or more client computing platforms 124. The one or more servers 102 and/or chat server(s) 140 may be configured to communicate with one or more client computing platforms 124 according to a client/server architecture and/or other communication schemes. The one or more client computing platforms 124 may include one or more of a cellular telephone, a smartphone, a digital camera, a laptop, a tablet computer, a desktop computer, a television set-top box, smart TV, a gaming console, and/or other client computing platforms.

The one or more servers 102 may include one or more of one or more physical processors 104, non-transitory electronic storage 126, and/or other components. Non-transitory electronic storage 126 may include one or more records. The records may include user records 128, project records 130, work unit records 132, and/or other records. The one or more physical processors 104 may be configured to access one or more of the records to effectuate transmission of the environment state information over network 133 to client computing platform(s) 124

The chat server(s) 140 may include one or more of one or more physical processors 144, non-transitory electronic storage 142, and/or other components.

The client computing platform(s) 124 may include one or more physical processors 105, non-transitory electronic storage 120, one or more displays 119, and/or other components. The client computing platform(s) 124 may monitor, and/or collect information for transmission to the one or more servers 102 to be stored as environment state information. The client computing platform(s) 124 may obtain and/or collect environment state information from the one or more servers 102. Client computing platform(s) 124 may use the environment state information to effectuate presentation of the collaboration environment via client computing platform(s) 124.

The one or more physical processors 104, physical processor(s) 144, and/or physical processors 105 may be configured to execute machine-readable instructions 106, machine-readable instructions 146, and/or machine-readable instructions 107. Machine-readable instructions may include one or more computer program components. The computer program components may include one or more of an environment state component 108, a chat application component 148, a collaboration environment component 110, a user chat component 112, a content component 114, a view page component 116, and/or other components.

It is noted that while some computer program components may be shown and described as attributed to an individual one of or more of chat servers(s) 140, client computing platform(s) 124, and/or server(s) 102, this is for illustrative purposes only. Instead, it is to be understand that the features and/or functionality of one of these entities may be additionally and/or alternatively be attributed to another one of these entities.

In some implementations, server(s) 102 and/or chat server(s) 140 may be configured to provide remote hosting of the features and/or functions attributed thereto to one or more client computing platforms 124 that may be remotely located from server(s) 102 and/or chat server(s) 140. In some implementations, one or more features and/or functions of server(s) 102 and/or chat server(s) 140 may be attributed as local features and/or functions of one or more client computing platform(s) 124. For example, individual ones of the client computing platform(s) 124 may include one or more additional machine-readable instructions comprising the same or similar components as machine-readable instructions 106 of server(s) 102 and/or machine-readable instructions 146 of chat server(s) 140. The client computing platform(s) 124 may be configured to locally execute the one or more components. One or more features and/or functions of machine-readable instructions 106 of server(s) 102 may be provided, at least in part, as an application program that may be executed at a given client computing platform. One or more features and/or functions of machine-readable instructions 107 may be provided, at least in part, at server(s) 102.

The presentation of the collaboration environment may be based on environment state information. The environment state information may include user records 128, project records 130, work unit records 132, objective records (not shown), and/or other records. The environment state information may be continuously generated and/or updated based on the state of the collaboration environment representing the users' interactions with the collaboration environment. The state of the collaboration environment may include a user state, a project state, a work unit state, objective state, and/or other states. The user state may be defined by user records 128. User records 128 may define user information associated with users interacting with and/or viewing the collaboration environment. The project state may be defined by project records 130. Project records 130 may define project information for projects managed within the collaboration environment. Managing may include one or more of obtaining, defining, storing, updating, deleting, and/or other operations. The work unit state may be defined by work unit records 132. Work unit records 132 may define values of work information for units of work created and/or assigned within the collaboration environment. The objective state may be defined by objective records. objective records may define objective information associated with business objectives The user information in user records 128 may include values of user parameters for individual users, and/or other information. The values of user parameters may, by way of non-limiting example, specify one or more of: a user name, a group parameter, a user account, user role information, a user department, descriptive user content, a to-email, a from-email, a photo, an organization, a workspace, one or more projects (which may include project parameters defined by one or more work unit records), one or more business objectives owned and/or managed by a user, one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, business objective level, etc.), one or more notification settings, one or more progress parameters, status information for one or more units of work the user is associated with (units of work assigned to the user, assigned to other users by the user, completed by the user, past-due date, and/or other information), one or more performance metrics of a given user (e.g., how many units of work the user has completed, how quickly the user completed the units of work, how quickly the user completes certain types of units of work, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, other user parameters for the given user.

User role information may specify individual roles of the individual users in the individual units of work, projects, and/or business objectives. A role may represent a position of an individual user. The position may be specified based on a description of one or more of job title, level, stage, and/or other descriptions of position. The role may be specified with respect to a company as a whole, a particular unit of work, a particular business objective, and/or other considerations. By way of non-limiting illustration, a role may include one or more of chief executive officer (or other officer), owner, manager, supervisor, accountant, associate, employee, entry level, midlevel, senior, administrator, director, foreman, engineer, product developer, human resource officer, artist, art director, and/or other description.

Schedule information for the individual users may include one or more calendar entries associated with the individual users. The individual calendar entries may be associated with individual start dates and individual end dates. In some implementations, schedule information may be stored locally within electronic storage 120 by virtue of features and/or functionality provided within a collaboration environment. By way of non-limiting illustration, a collaboration environment may have the features and/or functionality of calendar application configured to facilitate calendaring entries into a schedule. It is noted that schedule information may be determined through features and/or functionality provided by one or more external resources 122. By way of non-limiting illustration, an external resource may include a calendar application which may be external to a collaboration environment. The collaboration environment may have permissions to access the external calendar application to determine and/or obtain schedule information.

The work information in work unit records 132 may include values of one or more work unit parameters. The values of the work unit parameters may be organized in work unit records corresponding to units of work managed, created, and/or assigned within the collaboration environment. A given unit of work may have one or more assignees and/or team members working on the given unit of work. Units of work may be associated with one or more to-do items, action items, objectives, and/or other units of work one or more users should accomplish and/or plan on accomplishing. Units of work may be created by a given user for the given user and/or created by the given user and assigned to one or more other users. A given unit of work may include one or more of a task, a sub-task, and/or other units of work possibly assigned to and/or associated with one or more users.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

The one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, values of one or more work unit parameters of a given unit of work may describe the unit of work based on one or more of a unit of work name, a unit of work description, one or more unit of work dates (e.g., a start date, a due date, an end date, a completion date, and/or dates), one or more members associated with a unit of work (e.g., an owner, one or more other project/task members, member access information, and/or other unit of work members and/or member information), a status parameter (e.g., an update, a hardcoded status update, a completed/uncomplete/mark complete, a measured status, a progress indication, quantity of sub-work units remaining for a given unit of work, completed units of work in a given project, and/or other status parameter), one or more user comment parameters (e.g., permission for who may comments such as a creator, a recipient, one or more followers, and/or one or more other interested parties; content of the comments; one or more times; presence or absence of the functionality of up-votes; one or more hard-coded responses; and/or other parameters), one or more business objectives the unit of work is associated with, one or more interaction parameters (e.g., indicating a given unit of work is being worked on/was worked on, given unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.,), state of a workspace for a given unit of work (e.g., application state parameters, application status, application interactions, user information, and/or other parameters related to the state of the workspace for a unit of work), dependencies between one or more units of work, one or more custom fields (e.g., priority, cost, stage, and/or other custom fields), quantities of work production for the unit of work (e.g., quantity of lines of code, quantity of lines of copy, etc.), and/or other information.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a parameter of a work unit record of a unit of work, and/or other actions.

Objective records may store objective information and/or other information. The objective information may include values of one or more objective parameters. The values of the objective parameters may be organized in objective records corresponding to business objectives managed, created, and/or owned within the collaboration environment. The business objectives may be associated with a set of units of work that may indirectly facilitate progress toward fulfillment of the business objectives. The set of units of work may not directly contribute to the progress. By way of non-limiting illustration, a connection between the set of units of work and a corresponding business objective may be indirect in that completion of at least one of the units of work may have no direct impact on progress toward fulfillment of the business objective. The concept of "no direct impact" may mean that completion of the at least one unit of work may not cause progress toward fulfillment of the business objective without independent action outside of the at least one unit of work. Instead, the fulfillment of the at least one business objective may make such independent action more likely (e.g., through coercion, assistance, education, incentivization, reminder, etc.). However, in some implementations, business objectives may be associated with a set of units of work that may directly facilitate progress toward fulfillment of the business objectives. Accordingly, completion of the set of units of work may directly contribute to the progress toward fulfillment.

Individual objective records may describe individual business objectives and identify sets of individual ones of the work unit records that specify the units of work associated with the individual business objectives. A given business objective may have one or more collaborators, and/or team members working on the given business objective. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users. By way of non-limiting illustration, a first objective record may describe a first business objective and identify a first set of work unit records that specifies a first set of units of work associated with the first business objective.

In some implementations, business objectives may be derived from, and/or associated with, events and/or other information. The events may be external and/or integral to the collaboration environment. Events may include occurrences within an external resource (e.g., external resource(s) 122) and/or occurrences in the real world.

External resources may include application programs accessible to the collaboration environment. An application program may be external to the collaboration environment and/or integrated into the collaboration environment. An application program external to the collaboration environment may be accessible by exiting (closing, minimizing, etc.) the environment and launching the application program separately. An application program integrated into the collaboration environment may be accessible within the environment and/or that access may not require leaving or exiting the environment. By way of non-limiting illustration, application programs may include social media applications, E-mail applications, messaging applications, presentation applications, file storage application, communication applications, news applications, and/or other application programs.

By way of non-limiting illustration, a business objective may be to reach a given quantity of subscribers on a social media page. The business objective may be derived from an event including a social media application showing subscribership to the social media page is reaching and/or exceeding the given quantity of subscribers. By way of non-limiting illustration, a business objective may be to increase the click-through-rate (CTR) on an ad on a webpage by a given percentage. The business objective may be derived from an event including an analytics program showing the CTR for the ad.

An occurrence within the real world may be determined through human observation with and/or without the assistance of a computer. By way of non-limiting illustration, a business objective may be to become more prominent in a given field of industry. The business objective may be derived from an event including the business being mentioned in an article written about the given field of industry. By way of non-limiting illustration, a business objective may be to onboard five new clients in a given month. The business objective may be derived from an event including observing the number of new clients being onboarded that given month. By way of non-limiting illustration, a business objective may be to increase the flow of foot traffic into a shop. The business objective may be derived from an event including observing the number of customers walking into the shop.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record. Individual objective records may include hierarchical information defining an objective record hierarchy of the individual objective records. The hierarchical information of an objective record may include one or more of information identifying other objective records associated in an objective record hierarchy, a specification of the position of the objective record in the hierarchy, other relationships placed on the objective record by virtue of its position, and/or other information. In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective progress parameter, and/or other parameters. The value of the objective definition parameter may describe a particular business objective. The values of an objective progress parameter may specify progress information for a particular business objective, and/or other information.

In some implementations, the business objectives may be described based on one or more of a business objective specification, one or more business objective dates (e.g., a start date, a due date, and/or dates), one or more members associated with a business objective (e.g., an owner, one or more other project/task members, member access information, and/or other business objective members and/or member information), one or more interaction parameters (e.g., indicating a given business objective was viewed, a given business objective was selected, how long the given business objective has been idle, a last interaction parameter indicating when and what user last interacted with the given business objective, users that interacted with the given business objective, and/or other interaction parameters indicating sources of the interactions, context of the interactions, content of the interactions and/or time for the interactions), notification settings, privacy, one or more custom fields (e.g., priority, cost, stage, and/or other custom fields), identification of units of work associated with a business objective, and/or other information.

A business objective specification may include one or more of what the business objective is (e.g., what is the desired outcome), an event associated with the business objective, an external resource associated with the business objective, and/or other information.

Progress information for the individual business objectives may convey progress toward fulfillment of the individual business objectives. The progress information for the individual business objectives may convey progress toward fulfillment of the individual business objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual business objectives may be determined independently from incremental completion of the units of work in the individual sets of units of work associated with the individual business objectives. Meaning, the completion of the units of work associated with a given business objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

The project information in project records 130 may define values of project parameters for projects managed within the collaboration environment. The project parameters may characterize one or more projects managed within the collaboration environment and/or via the collaboration work management platform, and/or the metadata associated with the one or more projects. Individual ones of the projects may be associated with individual ones of the project records. The project information may define values of the project parameters associated with a given project managed within the collaboration environment and/or via the collaboration work management platform. A given project may have one or more owners and/or one or more team members working on the given project. The given project may include one or more units of work assigned to one or more users under the given project heading.

The values of the project parameters may, by way of non-limiting example, include one or more of: one or more units of work within individual ones of the projects (which may include task parameters defined by one or more work unit records), one or more user comment settings (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project members (e.g., an owner, one or more other project members, member access information, and/or other project members and/or member information), a status and/or progress (e.g., an update, a hardcoded status update, a measured status, quantity of units of work remaining in a given project, completed units of work in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

It is noted that any metadata and/or values of parameters related to any users, projects, business objectives, and/or units of work may be considered values of user parameters, project parameters, objective parameters, and/or work unit parameters.

The electronic storage 126, electronic storage 142, and/or electronic storage 120 may include electronic storage media that electronically stores information. The electronic storage media of electronic storage 126, electronic storage 142, and/or electronic storage 120 may include one or both of system storage that is provided integrally (i.e., substantially non-removable) and/or removable storage that is removably connected. The connection may be facilitated by, for example, a port (e.g., a USB port, a firewire port, etc.) or a drive (e.g., a disk drive, etc.).

The electronic storage 126, electronic storage 142, and/or electronic storage 120 may individually include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126, electronic storage 142, and/or electronic storage 120 may individually include one or more virtual storage resources (e.g., cloud storage, a virtual private network, and/or other virtual storage resources). The electronic storage 126, electronic storage 142, and/or electronic storage 120 may individually store software algorithms, information determined by processor(s) 104, information received by one or more servers 102, information received by client computing platforms 124, and/or other information that enables the functionality described herein.

The electronic storage 126 may be configured to store one or more records and/or information. The one or more records may include one or more of user records 128, project records 130, work unit records 132, objective records, and/or other records. The one or more records may specify correspondences between individual records. The correspondences may be used to determine which user parameters and/or values, project parameters and/or values, objective parameters and/or values, work unit parameters and/or values are associated with a given user, project, business objective, and/or unit of work within the collaboration environment, and/or other information.

The environment state component 108 may be configured to manage the environment state information and/or other information used in maintaining a collaboration environment. The environment state information may include one or more of the user information, the work information, the project information, the objective information, and/or other information used to define, support, and/or otherwise maintain the collaboration environment.

In some implementations, collaboration environment component 110 of machine-readable instructions 107 may be configured to effectuate presentation of the collaboration environment. Presentation of the collaboration environment may be based on the environment state information.

The client computing platform(s) 124 may effectuate presentation of the collaboration environment. The collaboration environment may include the environment in which users interact with and/or view the one or more units of work and/or projects managed via the collaboration work management platform. The collaboration environment may exist whether or not a given user is viewing and/or interacting with the collaboration environment. In some implementations, projects managed via the collaboration environment may include one or more units of work. By way of non-limiting example, the one or more units of work may include action items, to-do items, and/or objectives within a given project. The one or more units of work may be assigned to one or more users such that the one or more units of work assigned to a given user may appear on a given user's unit of work list within the collaboration environment.

In some implementations, user chat component 112 and/or chat application component 148 may be configured to implement an instance of chat sessions to facilitate communication between the users within the collaboration environment. User chat component 112 and/or chat application component 148 may receive an/or transmit the communications (e.g., textual communications, graphical communications, voice communications, video communications, etc.) that make up the chat sessions to the client computing platforms for presentation through graphical chat interfaces. The graphical chat interface may be presented on the client computing platforms 124 via display(s) 119 within and/or outside to the collaboration environment. The chat sessions may be hosted by the collaboration environment and/or one or more third party chat applications integrated with the collaboration environment via an application program interface (API). The chat-sessions may be provided by one or more third-party chat applications via one or more APIs. In some implementations the collaboration environment may host and/or provide one or more of the chat sessions. The graphical chat interface may include its own interface and/or a portion of one or more collaboration environment interfaces for displaying one or more units of work, business objectives, and/or projects for a given user.

In synchronous communication, individual users may receive communication inputs from other users in real-time or near real-time, i.e., without significant delay. In asynchronous communication, time delays may occur between sending communications inputs and receiving the sent communication inputs. In some implementations, the user chat component 112 and/or chat application component 148 may be configured to mediate asynchronous communication to ensure correct receiving orders. It is noted that, in some implementations, the features and/or functions described herein may be implemented in asynchronous chat communication. By way of non-limiting illustration, a message may be sent to someone, and if they read the message at a later time, the page views may be presented to them.

The textual communications may be received and entered by the users via their respective client computing platforms and may be routed to and from the appropriate users through chat server(s) 140 via a chat session implemented by the chat application component 148. A chat session may include complete textual communication inputs from users who have participated in the chat session. The textual communication inputs in a chat session may be stored on and accessed from the electronic storage 142. In some examples, a chat session may be open ended such that it does not finish until a provider, administrator, moderator, and/or any other entities related to the collaboration environment decide not to provide the chat session. In some other examples, a chat session may be initiated and stopped by users at any time as desired.

By way of non-limiting illustration, the first chat session may be presented to the first user via a first chat interface. The first chat interface may be presented on a first client computing platform (i.e., via a first display) associated with the first user, and/or to the second user via a second chat interface presented on a second client computing platform (i.e., via second display) associated with the second user.

The content component 114 may be configured to obtain content information and/or other information. The content information may characterize content of the chat sessions between the users of the collaboration environment. The content information for the chat sessions may be obtained at the conclusion of a chat session, and/or in real-time and/or near real-time during the chat session. Chat sessions may include a series of communications between two or more users of the collaboration environment. The chat sessions may include one or more of a messenger chat session, a video chat session, a phone chat session, and/or other chat sessions. By way of non-limiting illustration, the chat sessions may include the first chat session between the first user and the second user and/or other chat sessions between other users. As such, first content information characterizing content of the first chat session may be obtained.

In some implementations, the chat sessions may be related to and/or specific to a given project, a user, a business objective, and/or unit of work within the collaboration environment, an E-mail, a particular textual message, audio recording, video, and/or other information. As such, the users participating in the given chat session may be working on and/or discussing the related and/or specific project, user, business objective, unit of work, E-mail, textual message, audio recording, video, and/or other information.

For example, the first chat session may be a unit of work-specific chat session. The first chat session may relate to Unit of work A. In some implementations, the chat sessions may be between two users and/or more than two users. Content component 114 may be configured to transcribe one or more spoken communications. In some implementations, content component 114 may be configured to determine a source and/or intended recipient of individual chat items within the chat session.

The content information obtained by content component 114 may describe the content included in a given chat session. By way of non-limiting example, content information may include one or more communication inputs by the users within the chat sessions, one or more spoken and/or transcribed communications spoken by the users within the chat sessions, one or more words and/or phrases included in the chat sessions, the source of the spoken and/or textual communications, the intended recipient of the spoken and/or textual communications, and/or other content information. The communication inputs in the chat session may be presented through a graphical chat interface on display(s) 119 of the client computing platform(s) 124.

In some implementations, the content information may include context information. Context information may include setting information, content information for communications immediately preceding and/or following a trigger word and/or phrase, information describing the one or more units of work, business objectives, E-mails, audio recordings, videos, and/or projects the chat session relates to, user information for one or more of the users participating in the chat session (e.g., one or more projects and/or units of work associated with the user, the user's role/department/qualifications, historical user information, and/or other user information), and/or other context information.

In some implementations, the chat sessions may facilitate synchronous and/or semi-synchronous communication between the users of the collaboration environment. By way of non-limiting example, the synchronous and/or semi-synchronous communication may include phone communications, video communications, messenger communications, and/or other communication. In some implementations, the chat sessions may be text chat sessions. In some implementations, the chat sessions may be voice and/or video chat sessions.

The content component 114 may be configured to identify one or more records and/or other content based on the content from the chat sessions. By way of non-limiting illustration, records may include one or more of the work unit records, the user records, the project records, the objective records, and/or other records. Other content may include content obtained from content records. The content records may include one or more of one or more of E-mail records including email content, video records including video content, social media records including social media content, audio records including audio content, and/or other records. The other content may be obtained from sources outside system 100 (e.g., external resource(s) 122), and/or from components integral to system 100. It is noted that while one or more implementations described herein may be directed to identifying work unit records, this is for illustrative purposes only. Instead, it is to be understood that the features and/or functions described herein may be extended to other records and/or other content, which may be referred to herein collectively as "records" and/or "content records" whether or not a specific "record" for the content has been specifically described herein.

In some implementations, individual records may be identified in real-time and/or near real-time during the chat session. By way of non-limiting example, as the user starts typing within the chat interface, content component 114 may identify a first work unit record based on the first content information for the first chat session. The records, in some implementations, may be identified at or near the conclusion of the chat sessions. In some implementations, one or more records identified based on the content from the chat sessions may be presented to one or more of the users as one or more potential records. The potential records may be presented to the one or more users for confirmation and/or acceptance. One or more of the users may accept and/or confirm one or more of the potential records at the conclusion of the given chat session to identify the records. A chat session may conclude when: a threshold amount of time passes without any communication from one or more users, a user exits or closes the chat interface, the user minimizes the chat interface, the user responds to a request with acceptance language (e.g., "sure", "okay", "will do", "I'll take care of it.", etc.) and/or the user otherwise concludes the chat session.

In some implementations, the one or more records may be identified based on information from multiple users within a chat session being pieced together to identify the one or more records.

In some implementations, the records may be automatically identified and/or identified by the users based on the content information. By way of non-limiting example, the content component 114 may be configured to identify identification language based on the content information for the chat sessions. Responsive to the content component 114 identifying identification language in response to communications triggering identification of a record, content component 114 may automatically identify the record on behalf of the user.

In some implementations, the content component 114 may be configured to identify potential content in the content of the chat sessions that leads to the identification of the one or more records. The potential content from the chat sessions that leads to the identification of the one or more of the records may include one or more trigger phrases and/or words. The potential content may include content that is likely to trigger identification of the one or more records. The trigger phrases and/or words may include one or more of a name of a user linked to a unit of work, a title of a unit or work, a description of a unit of work, a date associated with a unit of work, a name of a user linked to a project, a title of a project, a description of a project, a date associated with a project, a name of a user linked to a business objective, a title of a business objective, a description of a business objective, a date associated with a business objective, a name of a user linked to an E-mail, a subject of an E-mail, a body of an E-mail, a date associated with an E-mail, a name of media (e.g., audio recording, video, photo), a caption of media, a name of a user linked to media, a title of media, a description of media, a date (e.g., postdate, release date), and/or other trigger words and/or phrases. Thus, the records may be identified responsive to identifying one or more of the trigger phrases and/or words. By way of non-limiting illustration, the first work unit record may be identified responsive to identifying a first trigger phrase and/or word in the first chat session based on the first content information.

In some implementations, content component 114 may be configured to identify potential trigger phrases and/or words based on the potential content identified. In some implementations, content component 114 may be configured to determine and/or identify one or more words and/or phrases as trigger phrases and/or words. Content component 114 may be configured to identify potential content in the content of the chat sessions that leads to search and retrieval of one or more of the units of work, projects, business objects, E-mails, media, and/or other records by the users. The potential content that leads to search and retrieval of one or more of the records in the collaboration environment by the users may be identified based on the environment state information.

The trigger phrases and/or words may indicate an identification and/or one user's request, desire, inquiry, and/or need to another user. By way of non-limiting example, content component 114 may monitor chat sessions between users in the collaboration environment and/or identify that whenever a user states "Will you complete X . . . " they typically search a unit of work for X shortly thereafter. As such, content component 114 may identify "will you" as a trigger phrase. By way of non-limiting example, the trigger phrases and/or words may include one or more of will you, can you, could you, please, by a given date, before the given date, we need, I need, I want, would be grateful if, and/or you could.

In some implementations, the records may be further identified based on context of the chat sessions. As such, for example, the first unit of work may be identified based on first context information related to the first chat session, the first user and/or the second user, a first project and/or unit of work, and/or other context information. The records may define a unit of work within an overarching project, a subunit of work, and/or other units of work.

The view page component 116 may be configured to generate views of record pages in the chat sessions that correspond to the records identified based on the content from the chat sessions. The pages may include one or more of work unit pages, user pages, project pages, objective pages, E-mail thread pages, and/or other pages that correspond to individual records identified based on the content from the chat sessions. As such, the views of the pages may be made accessible to the users participating in a given chat session during the communication facilitated by the given chat session. By way of non-limiting example, a view of a first work unit page for the first work unit record may be generated in the first chat session. Thus, the view of the first work unit page may be made accessible to the first user and the second user during the communication facilitated by the first chat session.

In some implementations, the record pages may display values of one or more parameters described by the records. By way of non-limiting illustration, the work unit pages of the work unit records may display values of one or more parameters of the units of work described by the work unit records. By way of non-limiting illustration, the values to the one or more parameters of the units of work that may be display on the work unit pages may include the unit of work name, the unit of work description, one or more unit of work dates, an assignee of the units of work, among other parameters.

In some implementations, the view page component 116 may be configured to effectuate presentation of viewing panes within the graphical chat interfaces. The individual viewing panes may comprise portions of the graphical chat interfaces that may display the pages. The user may select a full and/or partial viewing pane of the graphical chat interface within the graphical user interfaces associated with the collaboration environment presented on displays 119 of the client computing platforms 124. The portions of the graphical chat interfaces that may display the pages may be presented on a left side portion of a given graphical chat interface, a right side portion of the given graphical chat interface, a top portion of the given graphical chat interface, a bottom portion of the given graphical chat interface, a window pop-up of the given graphical chat interface, and/or other portions. The portion and size thereof which may display the pages may be pre-set by the collaboration environment and/or modifiable by the users, or may be fixed and unmodifiable by the users. For example, the viewing pane may comprise the right-side portion of the given graphical chat interface that comprises half of the given graphical chat interface.

In some implementations, the views of the pages (e.g., the work unit pages, the user pages, the project pages, the objective pages) may include view-only views of the pages such that the corresponding records are uneditable via the views of the pages.

In some implementations, the views of the pages may include instances of the record pages of the records such that the records are editable via the views of the pages. For example, the views of the work unit pages may include instances of work unit records where the work unit records are editable via the views of the work unit pages. Some or all of the users participating in the chat sessions may be permitted to edit the records via the view of the pages. Editing the records may include modifying, changing, adjusting, adding, and/or removing one or more characteristics associated with individual ones of the records. By way of non-limiting example, the one or more characteristics of individual ones of the units of work may include one or more of a unit of work description, a user assigned to a unit of work, a due date, a start date, and/or other characteristics of the individual ones of the units of work that may be modified by the users via the views of the work unit pages.

Content component 114 may be configured to store information defining the records identified and subsequently edited as part of the environment state information. As such, for example, the first unit of work may be defined by an edited first work unit record. Content component 114 may be configured to communicate with collaboration environment component 110 and/or environment state component 108 to effectuate storage of the information defining the records identified and edited as part of the environment state information.

Figure 2:
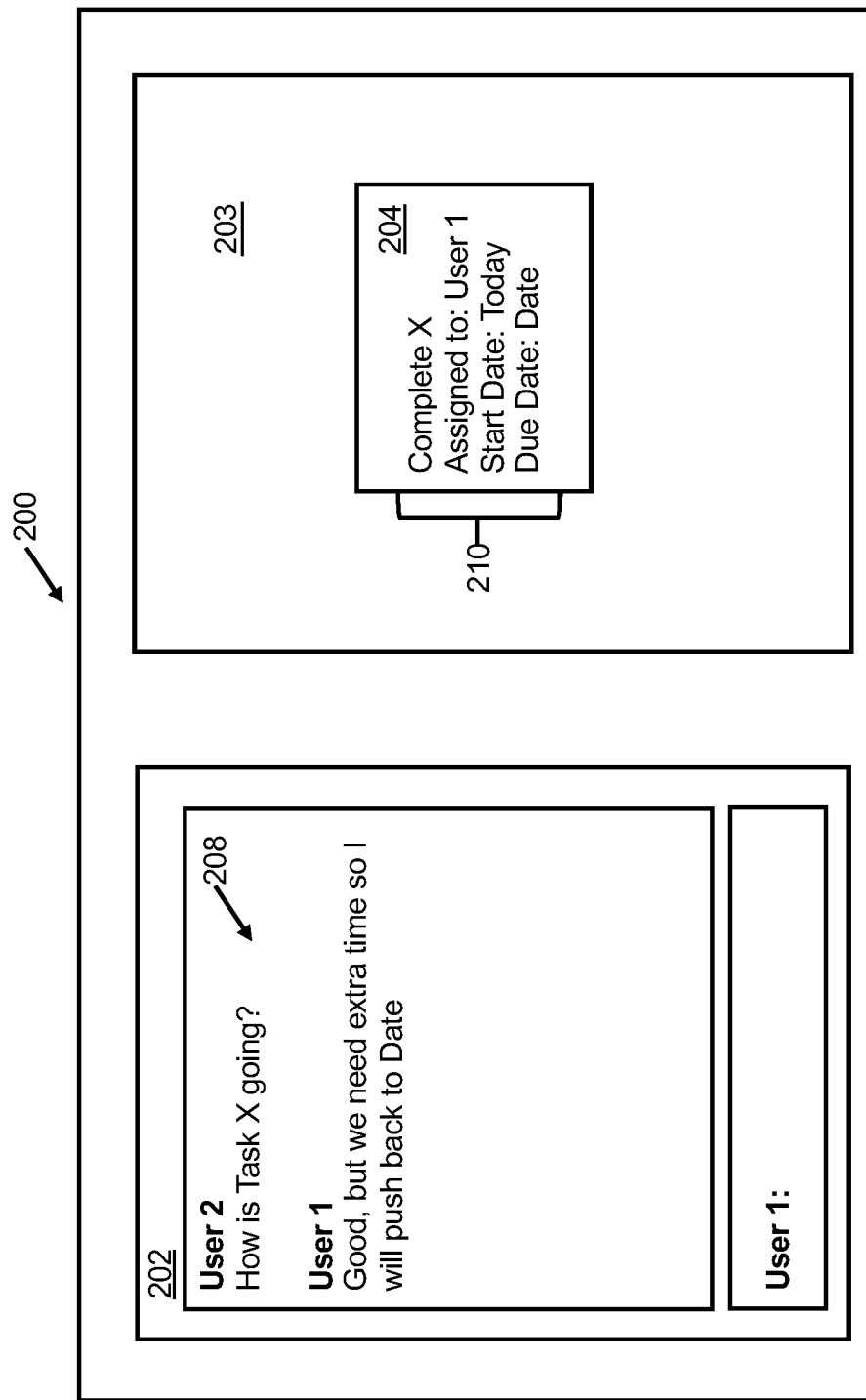
FIG. 2 illustrates an exemplary chat interface from which content information is obtained and used as a basis for presenting views of records, in accordance with one or more implementations.

FIG. 2 illustrates an exemplary chat interface 200, in accordance with one or more implementations. In some implementations, graphical chat interface 200 may be presented within a view of a collaboration environment and/or outside of the collaboration environment. Chat interface 200 may include one or more of a communications portion 202, a viewing pane 203, and/or other portions. Communications portions 202 may facilitate an exchange of textual communication 208 between User 1 and User 2 via graphical chat interface 200. Content from the textual communications 208 may be used to identify a work unit record, represented by a work unit page 204 in viewing pane 203. One or more fields 210 may be automatically identified for the work unit record and displayed in the viewing pane 203. Individual fields may represent values of individual parameters. The one or more fields 210 may be editable by User 1 and/or User 2.

Returning to FIG. 1, in some implementations, server(s) 102, client computing platform(s) 124, chat servers(s) 140, and/or external resource(s) 122 may be operatively linked via one or more electronic communication links. For example, such electronic communication links may be established, at least in part, via a network 133 such as the Internet and/or other networks. It will be appreciated that this is not intended to be limiting, and that the scope of this disclosure includes implementations in which server(s) 102, chat server(s) 124, client computing platform(s) 124, and/or external resource(s) 122 may be operatively linked via some other communication media.

A given client computing platform 124 may include one or more processors configured to execute computer program components. The computer program components may be configured to enable an expert or user associated with the given client computing platform 124 to interface with system 100 and/or external resource(s) 122, and/or provide other functionality attributed herein to client computing platform(s) 124. By way of non-limiting example, the given client computing platform 124 may include one or more of a desktop computer, a laptop computer, a handheld computer, a tablet computing platform, a NetBook, a Smartphone, a gaming console, and/or other computing platforms.

External resource(s) 122 may include sources of information outside of system 100, external entities participating with system 100, source of content (including one or more of E-mails, videos, video posts, audio recordings, audio posts, and/or other content), and/or other resources. In some implementations, some or all of the functionality attributed herein to external resource(s) 122 may be provided by resources included in system 100.

Server(s) 102 may include electronic storage 126, one or more processors 104, and/or other components. Chat server(s) 140 may include electronic storage 142, one or more processors 144, and/or other components. Client computing platform(s) 124 may include electronic storage 120, one or more processors 105, and/or other components. Server(s) 102, chat server(s) 140, and client computing platform(s) 124 may include communication lines, or ports to enable the exchange of information with a network 133 and/or other computing entities. Illustration of server(s) 102, chat server(s) 140, and client computing platform(s) 124 in FIG. 1 are not intended to be limiting. Server(s) 102, chat server(s) 140, and client computing platform(s) 124 may include a plurality of hardware, software, and/or firmware components operating together to provide the functionality attributed herein to server(s) 102, chat server(s) 140, and client computing platform(s) 124. For example, server(s) 102, chat server(s) 140, and client computing platform(s) 124 may be implemented by a cloud of computing platforms operating together as server(s) 102.

Processor(s) 104 may be configured to provide information processing capabilities in server(s) 102. Processor(s) 144 may be configured to provide information processing capabilities in chat server(s) 140. Processor(s) 105 may be configured to provide information processing capabilities in client computing platform(s) 124. As such, processor(s) 104, 144, and 105 may include one or more of a digital processor, an analog processor, a digital circuit designed to process information, an analog circuit designed to process information, a state machine, and/or other mechanisms for electronically processing information. Although processor(s) 104, 144, and 105 are shown in FIG. 1 as single entities, this is for illustrative purposes only. In some implementations, processor(s) 104, 144, and 105 may include a plurality of processing units. These processing units may be physically located within the same device, or processor(s) 104, 144, and 105 may represent processing functionality of a plurality of devices operating in coordination. Processor(s) 104, 144, and 105 may be configured to execute components 108, 110, 112, 114, 116, 148, and/or other components individually or in coordination. Processor(s) may be configured to execute components 108, 110, 112, 114, 116, 148, and/or other components by software; hardware; firmware; some combination of software, hardware, and/or firmware; and/or other mechanisms for configuring processing capabilities on processor(s). As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and 148 are illustrated in FIG. 1 as being implemented within single respective processing units, in implementations in which each processor(s) 104, 144, and 105 includes multiple processing units, one or more of components 108, 110, 112, 114, 116, and/or 148 may be implemented remotely from the other components. The description of the functionality provided by the different components 108, 110, 112, 114, 116, and/or 148 described below is for illustrative purposes, and is not intended to be limiting, as any of components 108, 110, 112, 114, 116, and/or 148 may provide more or less functionality than is described. For example, one or more of components 108, 110, 112, 114, 116, and/or 148 may be eliminated, and some or all of its functionality may be provided by other ones of components 108, 110, 112, 114, 116, and/or 148. As another example, processor(s) 104, 144, and 105 may be configured to execute one or more additional components that may perform some or all of the functionality attributed below to one of components 108, 110, 112, 114, 116, and/or 148.

Figure 3:
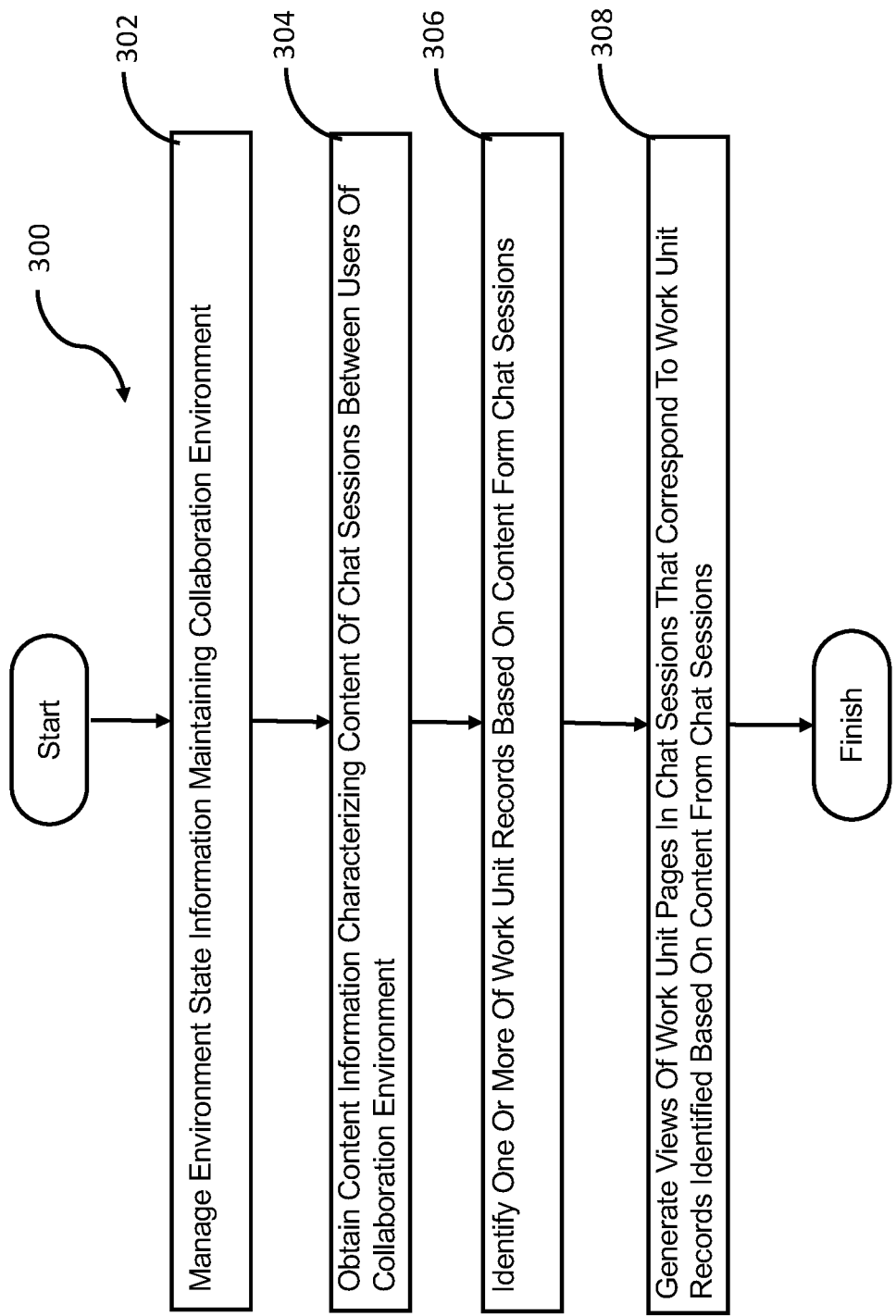
FIG. 3 illustrates a method for presenting view of records in chat sessions between users of a collaboration environment, in accordance with one or more implementations.

FIG. 3 illustrates a method 300 for presenting views of records in chat sessions between users of a collaboration environment, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may manage environment state information maintaining a collaboration environment and/or other information. The collaboration environment may be configured to facilitate interaction by users with the collaboration environment. The environment state information may include work unit records describing units of work assigned to, created by, and/or managed by individual users within the collaboration environment, and/or other records. Operation 302 may be performed by one or more hardware processors configured by machine-readable instructions including a component that is the same as or similar to environment state component 108, in accordance with one or more implementations.

An operation 304 may include obtaining content information characterizing content of the chat sessions between the users of the collaboration environment. The chat sessions may facilitate synchronous communication between the users and wherein the chat sessions include a first chat session between a first user and a second user, such that first content information characterizing content of the first chat session is obtained. Operation 304 may be performed by one or more hardware processors configured by machine-readable instructions including a component that is the same as or similar to content component 114, in accordance with one or more implementations.

An operation 306 may include identifying one or more of the work unit records and/or other records for the users based on the content from the chat sessions. A first work unit record may be identified based on the first content information for the first chat session. Operation 306 may be performed by one or more hardware processors configured by machine-readable instructions including a component that is the same as or similar to content component 114, in accordance with one or more implementations.

An operation 308 may include generating views of work unit pages and/or other pages in the chat sessions that correspond to the records identified based on the content from the chat sessions. The view of a first work unit page for the first work unit record may be generated in the first chat session. As synchronous communication is facilitated by this first chat session, the view of the first work unit page may be made accessible to the first user and the second user during said session. Operation 308 may be performed by one or more hardware processors configured by machine-readable instructions including a component that is the same as or similar to view page component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to present views of work unit records in chat sessions between users of a collaboration environment, the system comprising:
   one or more physical processors configured by machine-readable instructions to:
   manage environment state information maintaining a collaboration environment, the collaboration environment being configured to facilitate interaction by users with the collaboration environment, the environment state information including work unit records, the work unit records describing units of work previously created within the collaboration environment, and previously assigned within the collaboration environment to the users who are expected to accomplish one or more actions to complete the units of work;
   obtain content information characterizing content of chat sessions between the users of the collaboration environment, wherein the chat sessions facilitate synchronous communication between the users through graphical chat interfaces, and wherein the chat sessions include a first chat session between a first user and a second user through first graphical chat interfaces, such that first content information characterizes content of the first chat session;
   identify one or more of the work unit records previously created and previously assigned within the collaboration environment based on the content of the chat sessions, a first work unit record being identified based on the first content information for the first chat session, the first work unit record having been previously created and previously assigned to a given user within the collaboration environment; and
   in response to identifying the one or more of the work unit records previously created and previously assigned within the collaboration environment, generate views of work unit pages in the graphical chat interfaces of the chat sessions, the work unit pages corresponding to the work unit records identified based on the content of the chat sessions, the work unit pages comprising interfaces that present information stored in the work unit records, and that provide access to the work unit records such that the work unit records are editable via the views of the work unit pages within the graphical chat interfaces, such that a view of a first work unit page for the first work unit record is generated and presented concurrently with the first graphical chat interfaces of the first chat session during the synchronous communication of the first user and the second user, and wherein the first work unit page is an interface that presents information stored in the first work unit record, and provides access to the first work unit record so that first work unit record is editable by the first user and/or the second user within the view of the first work unit page presented concurrently with the first graphical chat interfaces.

2. The system of claim 1, wherein the one or more physical processors are further configured by the machine-readable instructions to:

implement instances of the chat sessions to facilitate the synchronous communication between the users within the collaboration environment, and transmit textual communications that make up the content of the chat sessions to client computing platforms for presentation through the graphical chat interfaces, the graphical chat interfaces being presented on the client computing platforms within and/or outside the collaboration environment, such that the first graphical chat interfaces are comprised of a first chat interface presented on a first client computing platform associated with the first user, and a second chat interface presented on a second client computing platform associated with the second user.

3. The system of claim 2, wherein the one or more physical processors are further configured by the machine-readable instructions to:

effectuate presentation of viewing panes within the graphical chat interfaces, individual ones of the viewing panes comprising individual portions of individual ones of the graphical chat interfaces that are dedicated to displaying individual ones of the views of the work unit pages.

4. The system of claim 1, wherein the one or more physical processors are further configured by the machine-readable instructions to:

identify potential content in the content of the chat sessions that leads to identification of the one or more of the work unit records.

5. The system of claim 4, wherein the potential content in the chat sessions that leads to the identification of the one or more of the work unit records includes trigger phrases and/or words, such that the one or more of the work unit records are identified responsive to identifying one or more of the trigger phrases and/or words, wherein the first work unit record is identified responsive to identifying a first trigger phrase and/or word in the first chat session based on the first content information.

6. The system of claim 5, wherein the trigger phrases and/or words include one or more of a name of a user linked to a unit of work, a title of a unit of work, a description of a unit of work, or a date associated with a unit of work.

7. The system of claim 1, wherein the work unit pages of the work unit records display editable values of one or more parameters of the units of work described by the work unit records.

8. The system of claim 1, wherein the one or more physical processors are further configured by the machine-readable instructions to:

identify one or more other records based on the content of the chat sessions, a first record being identified based on the first content information for the first chat session; and generate views of other record pages in the graphical chat interfaces of the chat sessions that correspond to the one or more other records identified based on the content of the chat sessions, such that a view of a first record page for the first record is generated in the first graphical chat interfaces of the first chat session such that the view of the first record page is made accessible to the first user and the second user during the synchronous communication facilitated by the first chat session.

9. A method to present views of work unit records in chat sessions between users of a collaboration environment, the method comprising:

managing environment state information maintaining a collaboration environment, the collaboration environment being configured to facilitate interaction by users with the collaboration environment, the environment state information including work unit records, the work unit records describing units of work previously created within the collaboration environment, and previously assigned within the collaboration environment to the users who are expected to accomplish one or more actions to complete the units of work;

obtaining content information characterizing content of chat sessions between the users of the collaboration environment, wherein the chat sessions facilitate synchronous communication between the users through graphical chat interfaces, and wherein the chat sessions include a first chat session between a first user and a second user through first graphical chat interfaces, such that first content information characterizes content of the first chat session;

identifying one or more of the work unit records previously created and previously assigned within the collaboration environment based on the content of the chat sessions, including identifying a first work unit record based on the first content information for the first chat session, the first work unit record having been previously created and previously assigned to a given user within the collaboration environment; and in response to identifying the one or more of the work unit records previously created and previously assigned within the collaboration environment, generating views of work unit pages in the graphical chat interfaces of the chat sessions, the work unit pages corresponding to the work unit records identified based on the content of the chat sessions, the work unit pages comprising interfaces that present information stored in the work unit records, and that provide access to the work unit records such that the work unit records are editable via the views of the work unit pages within the graphical chat interfaces, including generating and presenting a view of a first work unit page for the first work unit record concurrently with the first graphical chat interfaces of the first chat session during the synchronous communication of the first user and the second user, and wherein the first work unit page is an interface that presents information stored in the first work unit record, and provides access to the first work unit record so that first work unit record is editable by the first user and/or the second user within the view of the first work unit page presented concurrently with the first graphical chat interfaces.

10. The method of claim 9, further comprising:

implementing instances of the chat sessions to facilitate the synchronous communication between the users within the collaboration environment, and transmit textual communications that make up the content of the chat sessions to client computing platforms for presentation through the graphical chat interfaces, the graphical chat interfaces being presented on the client computing platforms within and/or outside the collaboration environment, including implementing and presenting the first graphical chat interfaces via a first chat interface presented on a first client computing platform associated with the first user, and a second chat interface presented on a second client computing platform associated with the second user.

11. The method of claim 10, further comprising:
effectuating presentation of viewing panes within the graphical chat interfaces, individual ones of the viewing panes comprising individual portions of individual ones of the graphical chat interfaces are dedicated to displaying individual ones of the views of the work unit pages.

12. The method of claim 9, further comprising:
identifying potential content in the content of the chat sessions that leads to identification of the one or more of the work unit records.

13. The method of claim 12, wherein the potential content in the chat sessions that leads to the identification of the one or more of the work unit records includes trigger phrases and/or words, such that the one or more of the work unit records are identified responsive to identifying one or more of the trigger phrases and/or words, wherein the first work unit record is identified responsive to identifying a first trigger phrase and/or word in the first chat session based on the first content information.

14. The method of claim 13, wherein the trigger phrases and/or words include one or more of a name of a user linked to a unit of work, a title of a unit of work, a description of a unit of work, or a date associated with a unit of work.

15. The method of claim 9, wherein the work unit pages of the work unit records display editable values of one or more parameters of the units of work described by the work unit records.

16. The method of claim 9, further comprising:
identifying one or more other records based on the content of the chat sessions, including identifying a first record based on the first content information for the first chat session; and
generating views of other record pages in the chat sessions that correspond to the one or more other records identified based on the content of the chat sessions, including generating a view of a first record page for the first record in the first graphical chat interfaces of the first chat session such that the view of the first record page is made accessible to the first user and the second user during the synchronous communication facilitated by the first chat session.

* * * * *